United States Patent [19]

Kakii et al.

[11] Patent Number: 5,339,376
[45] Date of Patent: Aug. 16, 1994

[54] GROOVED OPTICAL FIBER CONNECTOR INCORPORATING ELASTIC GUIDE PIN PRESSING MEMBERS

[75] Inventors: Toshiaki Kakii; Makoto Honjo; Hidetoshi Ishida; Hiroshi Katsura; Toru Yamanishi; Kazumichi Miyabe, all of Kanagawa; Tadashi Haibara; Michito Matsumoto, both of Ibaraki, all of Japan

[73] Assignees: Sumitomo Electric Industries, Ltd., Osaka; Nippon Telegraph and Telephone Corp., Tokyo, both of Japan

[21] Appl. No.: 942,061

[22] Filed: Sep. 9, 1992

[30] Foreign Application Priority Data

Sep. 9, 1991 [JP] Japan .................. 3-258482
Sep. 9, 1991 [JP] Japan .................. 3-258483
Aug. 17, 1992 [JP] Japan .................. 4-241313

[51] Int. Cl.$^5$ .................................... G02B 6/38
[52] U.S. Cl. ............................. 385/71; 385/59; 385/65; 385/83
[58] Field of Search ................ 385/58, 59, 60, 65, 385/70, 71, 75, 78, 83

[56] References Cited

U.S. PATENT DOCUMENTS

| | | | |
|---|---|---|---|
| 4,029,390 | 6/1977 | Chinnock et al. | 385/71 |
| 4,214,812 | 7/1980 | de Méndez | 385/59 |
| 4,475,790 | 10/1984 | Little | 385/137 |
| 4,629,284 | 12/1986 | Malavieille | 385/71 |
| 4,818,058 | 4/1989 | Bonanni | 385/59 |
| 4,830,456 | 5/1989 | Kakii et al. | 385/59 |
| 5,133,032 | 7/1992 | Salter et al. | 385/60 |

FOREIGN PATENT DOCUMENTS

| | | |
|---|---|---|
| 0171664 | 2/1986 | European Pat. Off. . |
| 0241724 | 10/1987 | European Pat. Off. ....... G02B 6/40 |
| 0249237 | 12/1987 | European Pat. Off. . |
| 0405620 | 1/1991 | European Pat. Off. . |
| 3443693 | 6/1986 | Fed. Rep. of Germany . |
| 2197804 | 8/1990 | Japan . |
| 3039907 | 2/1991 | Japan . |

*Primary Examiner*—Frank Gonzalez
*Attorney, Agent, or Firm*—Cushman, Darby & Cushman

[57] ABSTRACT

An optical connector for connecting optical fibers, comprises: a guide-groove substrate having grooves for positioning optical fibers and guide pins; an upper plate having groove portions each for covering the guide pins positioned in the guide grooves of the guide-groove substrate; elastic guide-pin pressing members each provided in the groove portions of the upper plate above portions where the guide pin grooves are in contact with the guide pins. In such a arrangement, it is preferable to form an oxide film on said V-grooves of the guide-groove substrate at least in the vicinity of contact points between the guide pins and the V-grooves. The optical connector further includes a resin molding portion for surrounding the substrate and the upper plate, the resin molding portion including a pair of opposite opened portions at a front and back surfaces thereof.

4 Claims, 7 Drawing Sheets

GROOVED OPTICAL FIBER CONNECTOR INCORPORATING ELASTIC GUIDE PIN PRESSING MEMBERS

BACKGROUND OF THE INVENTION

1. Field of the Invention

The present invention relates to an optical connector in which optical fibers are positioned and fixed and optical connection is realized by using guide pins in optical communication, and particularly to an optical connector in which connection guide pins and optical fibers are positioned and fixed by V-grooves provided in the optical connector.

2. Prior Art

Figure 1:
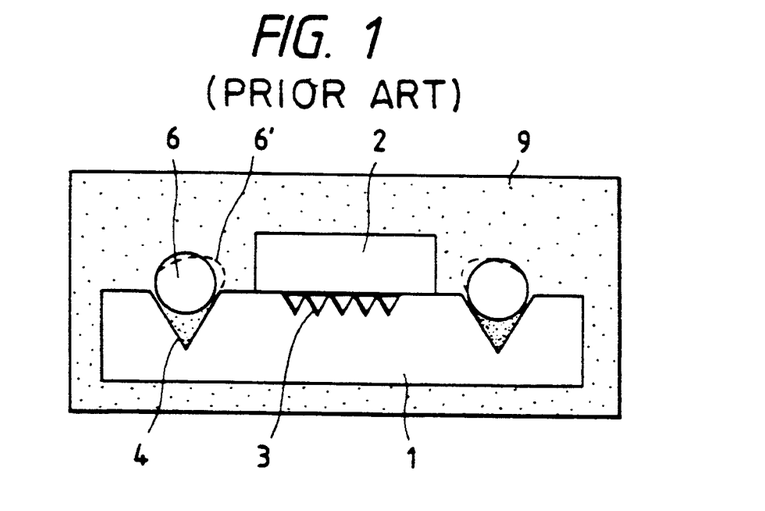
FIG. 1 is a front view of an end surface of a conventional multiple-coated-optical-fiber connector in which a guide-groove substrate is subjected to insert-molding so as to be integrated with a molding resin portion.

FIG. 1 shows an end surface view of a conventional optical connector for multiple coated optical fibers, in which a substrate with V-grooves is subjected to insert-molding so as to be integrated with a molding resin portion.

A substrate 1 is prepared so as to provide optical fiber guide grooves 3 and two guide pin grooves 4 arranged on opposite sides of a group of the optical fiber guide grooves 3 on an upper surface thereof. An upper plate 2 is bonded over the optical fiber guide grooves 3 of the substrate 1 in such a manner that upper surfaces of the guide pin grooves 4 are left to be entirely opened. By use of a metal mold, molding guide pins are subjected to insert-molding within the guide pin grooves 4 so that a resin molding portion 9 is formed to cover the substrate 1 and the upper plate 2.

At the time of coupling, the optical fibers are positioned and held in the optical fiber guide grooves 3, the end surfaces of the optical fibers are polished, and then the guide pins 7 are inserted into two guide pin holes 6 formed through molding respectively so that the optical fibers are positioned and coupled with each other. The coupling loss was about 0.25 dB in average in single-mode optical fibers.

In the conventional optical connector shown in FIG. 1, the guide pins 7 inserted into the guide pin holes 6 respectively are pressed by the molding resin portion 9 into the guide pin grooves 4 of the substrate 1, so that highly-accurate centering can be realized. However, there has been a problem that the guide pin holes 6 may be transformed as shown by dotted lines 6' by generation of shrinkage distortion of the molding resin after insert molding, so that the V-contact operation force of the guide pins 7 can not be sufficiently generated to make it difficult to realize optical connector coupling having a low loss not higher than 0.1 dB in single-mode optical fibers.

Figure 2:
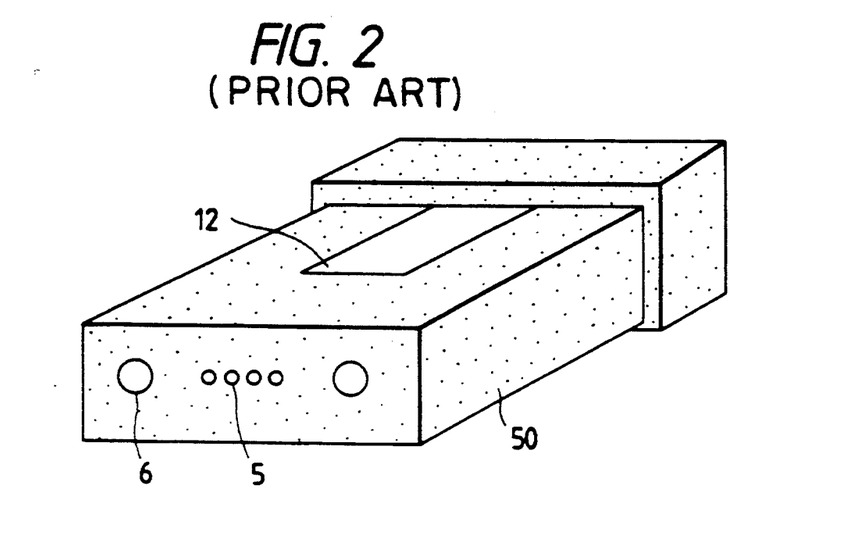
FIG. 2 is a perspective view of a conventional multiple-coated-optical-fiber connector for collectively connecting a plurality of optical fibers by using guide pins.

FIG. 2 is a perspective view of another conventional optical connector for collectively connecting a plurality of coated optical fibers by using guide pins. An optical connector 50 is formed of epoxy resin through molding and has such a structure that optical fiber holes 5 are arranged in one row in the inside of the optical connector 50 and guide pin holes 6 to which guide pins 7 be inserted are formed on the opposite sides of the row of optical fiber holes 5. Reference numeral 12 designates an opening portion from which a person can view the condition where the optical fibers are being inserted into the optical fiber guide grooves during the manufacture. Optical fibers are positioned and fixed in the optical fiber holes 5 and guide pins 7 made of stainless steel are inserted into the guide pin holes 6, so that optical connectors 50 in opposition to each other are positioned and fixed while being guided by the guide pins 7 to thereby realize an optical coupling.

Such an optical connector 50 employs a method in which optical fiber core pins for forming optical fiber holes 5 and guide pin core pins for forming guide pin holes 6 are positioned with high accuracy in a metal mold, resin is poured in the metal mold to perform molding, and then the respective core pins are drawn out after molding.

However, the outer diameter of each of the optical fiber core pins is very small, about 0.130 mm$\phi$, and it becomes difficult to perform molding with high accuracy because the optical fiber guide pins 7 are apt to be bent as the number of the optical fibers becomes larger in producing a connector for multiple coated optical fibers. Further, resin moldings have swelling characteristic against heat and humidity so that the pitch and diameter of the holes are apt to be changed, resulting in a problem in attaining a connection loss of about 0.1 dB in average.

SUMMARY OF THE INVENTION

The present invention has been attained so as to solve the problems described above, and an object of the invention is to provide an optical connector provided with a silicon V-groove connection member, which is highly accurate to attain an average contact loss of about 0.1 dB.

The object of the invention has been acheived by provision of an optical connector in which on a guide-groove substrate having grooves for positioning optical fibers and guide pins, there is provided an upper plate having groove portions for covering the guide pins positioned in said guide grooves respectively, and in that an elastic guide-pin pressing member is provided in each of said guide pin grooves of said guide-groove substrate above a portion where the guide pin groove is in contact with the guide pin.

Also, the optical connector of the invention is characterized in that the V-grooves are oxidized at least in the vicinity of contact points between the guide pins and the V-grooves to provide an oxide films. Preferably, the thickness of the oxide films is 0.01 to 2.0 $\mu$m.

Further, the optical connector of the invention is characterized in that the resin molding portion of the back surface of the V-groove guide member is opened at its part corresponding to an opening portion formed in an upper surface of the V-groove guide member so that the V-groove guide member is exposed at a part of a bottom surface thereof.

BRIEF DESCRIPTION OF THE DRAWINGS

FIGS. 9(a) and 9(b) are views for explaining an optical connector according to an embodiment of the present invention, in which FIG. 9(a) is a perspective view of the whole of the optical connector whereas

DETAILED DESCRIPTION OF THE PREFERRED EMBODIMENTS

Figure 3:
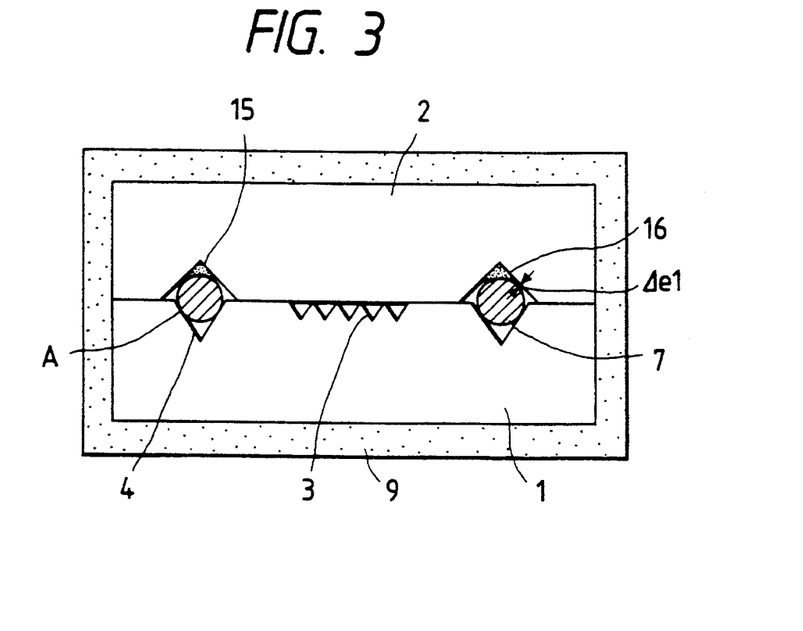
FIG. 3 is a front view of an end surface of an optical connector according to one embodiment of the present invention.

FIG. 3 is a front view of an end surface of an optical connector according to an embodiment of the present invention. As shown in the figure, a guide-groove substrate 1 made of a hard and brittle material such as silicon, ceramic, or the like is ground to form, in its upper surface, optical fiber guide grooves 3 and guide pin grooves 4. An upper plate 2 made of a material similar to that of the guide-groove substrate 1 is bonded on the guide-groove substrate 1 through a thin-film adhesive-agent layer or Si—Si direct bonding. Groove portions 15 for covering guide pins 7 positioned in the guide pin grooves 4 of the guide-groove substrate 1 are formed in the upper plate 2. In each of the groove portions 15, an elastic guide-pin pressing member 16 is provided only at a portion of the groove portion 15 above the center axis of the guide pin 7. Further, a molding resin portion 9 of epoxy resin or the like is provided through integral molding to cover the respective outer circumferences of the guide-groove substrate 1 and the upper plate 2 bonded with each other.

In this embodiment, for example, if Δe1, which is defined by a shortest distance between the periphery of the guide pin 7 and the surface of the groove portion 15 in the figure, is selected to be not more than 10 μm, the molding resin does not come to flow into each groove portion 15 of the upper plate 2 so that the elastic guide-pin pressing member 16 is formed only on the portion upper than the center axis of the guide pin 7.

Figure 4:
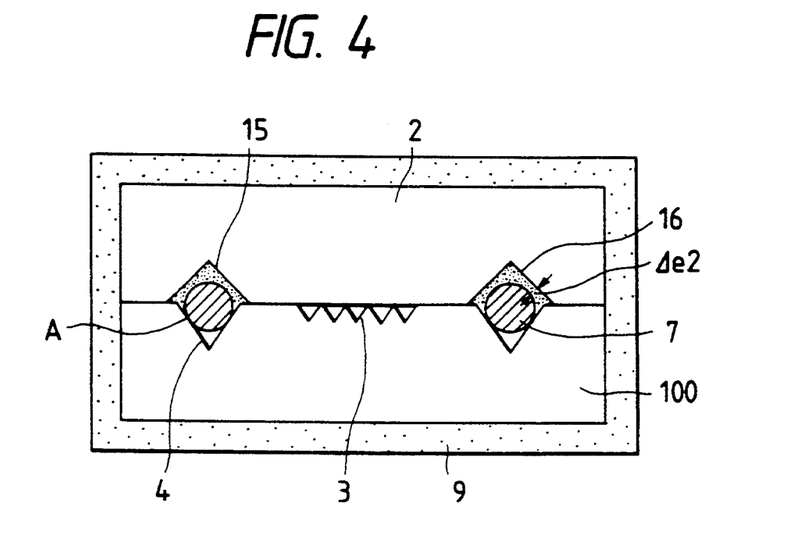
FIG. 4 is a front view of an end surface of an optical connector according to another embodiment of the present invention.

FIG. 4 is a front view of an end surface of an optical connector according to another embodiment of the present invention. In this embodiment, basically, the configurations of the upper plate 2 and the groove portion 15 are similar to those in FIG. 3 in that elastic guide-pin pressing members 16 are provided above contact points A between guide pins 7 and guide pin grooves 4, respectively. In this case, if Δe2, which is defined by the shortest distance between the periphery of the guide pin 7 and the surface of the groove portion 15 in FIG. 4, is selected to be not less than 30 μm, resin flows in to reach the contact points A.

In the embodiment of FIG. 3, downward pressing operation force is most easily generated against the guide pins 7. Even in the embodiment of FIG. 4, however, the resin is provided in the groove portion 15 only above the respective contact points A between the guide pins 7 and the guide pin grooves 4, so that the quantity of the resin covering the circumference of the guide pins 7 is less than that of the conventional example, and further, two guide pin holes are separated from each other by the upper plate 2 so that the shrinkage distortion of the resin at the time of molding can be remarkably reduced.

Figure 5A:
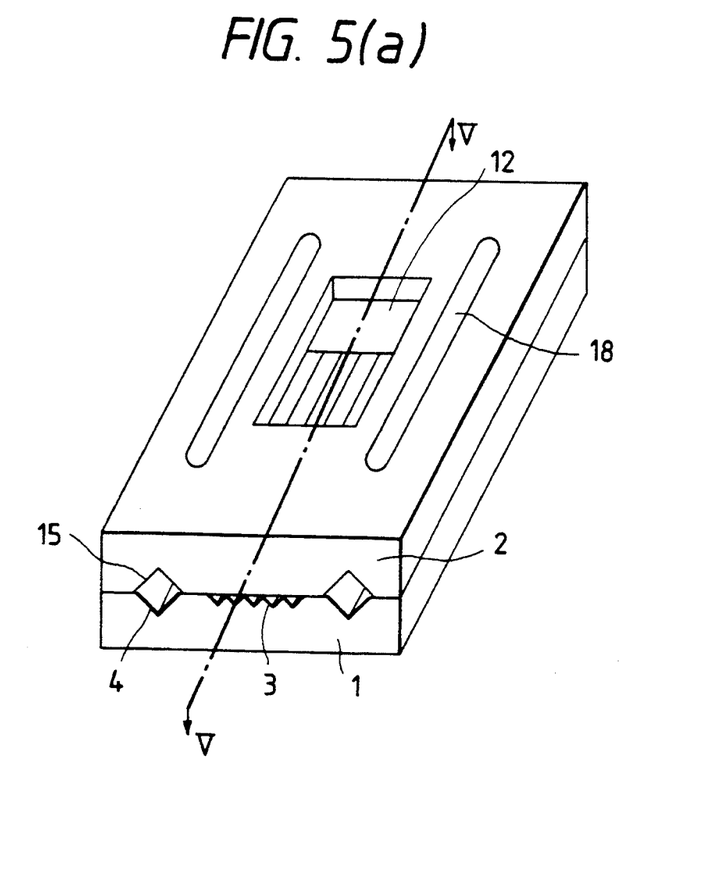
FIG. 5(a) is a perspective view showing a state in which opening portions are formed in an upper surface of an upper plate provided on a guide-groove substrate.
Figure 5B:
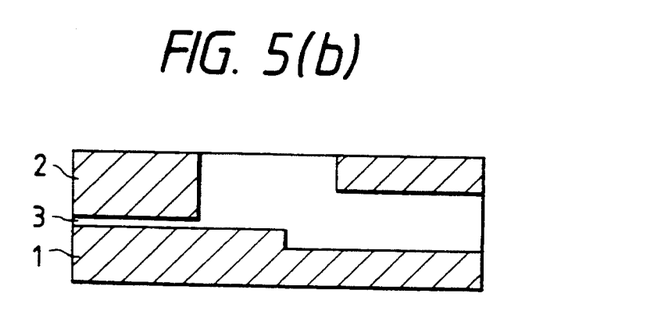
FIG. 5(b) is a cross sectional view taken along a line V—V in FIG. 5(a)

In FIGS. 5(a) and 5(b), opening portions 18 respectively communicating with groove portions 15 are formed in the upper surface of an upper plate 2 positioned on a guide-groove substrate 1. When the opening portions 18 are thus provided, resin may be poured into the groove portions 15 through the opening portions 18 to provide elastic guide-pin pressing members 16, or after elastic guide-pin pressing members 16 are inserted into the groove portions 15, molding may be made.

Figure 6A:
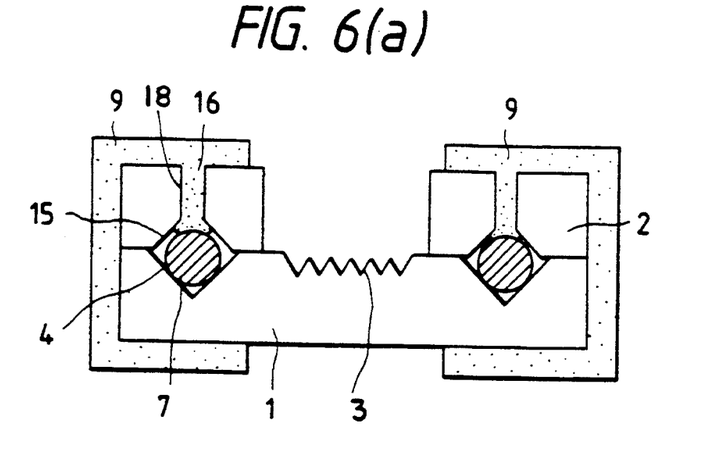
FIGS. 6(a) through 6(c) are explanatory views showing a section of a main portion in a method of forming a elastic guide-pin pressing member by use of the opening portion in FIG. 5.
Figure 6B:
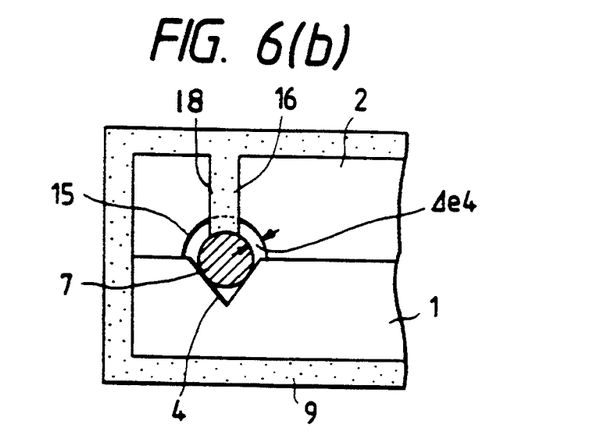
Figure 6C:
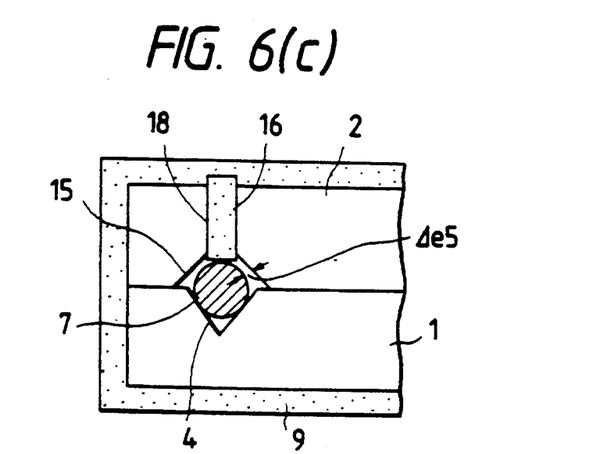

FIG. 6(a) is an explanatory views showing a cross section of an optical connector in a method of forming the elastic guide-pin pressing member 16 by use of the opening portions 18. FIGS. 6(b) and 6(c) are explanatory views showing cross sections of a main portion of an optical connector according to a modified example of FIG. 6(a).

FIGS. 6(a) and 6(b) show examples in which molding resin is poured through the opening portions 18 into the groove portions 15 of the upper plate 2 at the time of forming the outer-circumferential molding resin portion 9, and the molding resin is used as it is so as to form the elastic guide-pin pressing members 16. In this case, no particular shape of the groove portion 15 is required so long as Δe4 shown in FIG. 6(b), which is defined by the shortest distance between the periphery of the guide pin 7 and the inner surface of the groove portion 15, is selected to be not more than 10 μm. In FIG. 6(b), the groove portion 15 has a cross section of a semicircle whereas that in FIG. 6(a) has V-shaped cross section.

FIG. 6(c) shows an example in which a guide-groove substrate 1 and an upper plate 2 are subjected to insert-molding under the condition where elastic guide-pin pressing members 16 are inserted into the groove portion 15 at the time of forming an outer-circumferential molding resin portion 9. In this case, even if Δe5, which is defined by the shortest distance between the periphery of the guide pin 7 and the surface of the elastic guide-pin pressing member 16, is not less than 30 μm, the molding resin does not come to flow down. Further, the insert pressing members 16 can give downward operation force against guide pins 7 by the molding pressure of the molding resin even in the time of molding.

The coupling loss test of the optical connector thus organized, which has been conducted by the inventors, will be described.

Single-crystal silicon was used for a guide-groove substrate 1 and subjected to grinding so as to form optical fiber guide grooves 3 and guide pin grooves 4. An upper plate 2 made of the same material as that of the guide-groove substrate 1 and having groove portions 15 was bonded on the guide-groove substrate 1. The diameter of each guide pin 7 was selected to be 0.6985 mmφ. In this structure, Δe1 was set to be 5–10 μm, and transfer molding was carried out with epoxy resin containing silica to thereby produce a single mode optical fiber connector 50 having the structure shown in FIG. 3 for 32 coated optical fibers. The V-groove working was carried out with eccentricity within ±0.5 μm.

As a result of estimation on the thus obtained optical connector, the coupling loss attained 0.08 dB in average and 0.56 dB (n=20) at maximum. In order to confirm the pressing force operation of the elastic guide-pin pressing member 100, estimation was made on the coupling losses with respect to guide pins in a range of from 0.6980 mm$\phi$ to 0.6990 mm$\phi$. The coupling loss was within 0.1 dB in average in any case. Further, it was confirmed that there was no problem in practical use when the guide pin insertion force was in a range of from 50 to 250 g.

Further, in order to confirm reliability of the optical connector 50, the optical connector 50 was subjected to a heat cycle of from $-40°$ to $+70°$ C. and a wet heat test at 80° C. and 95% humidity. As a result, it was confirmed that loss scattering was within 0.03 dB which was not a problem.

Figure 7:
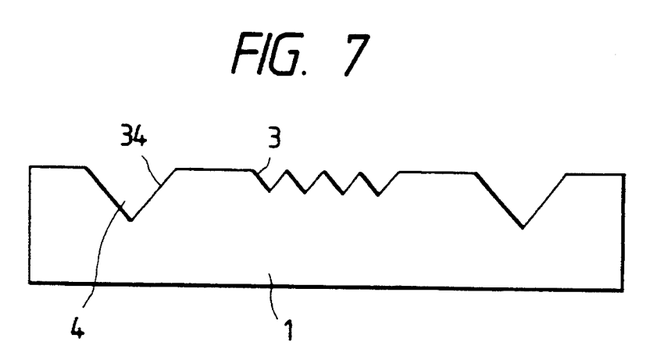
FIG. 7 is an end view of a silicon V-groove guide substrate in the optical connector according to a still further embodiment of the present invention.

In the embodiments described above, because the guide pin 7 is directly brought into contact with the surface of the guide pin groove 4 formed in the substrate 1, it is preferable to improve friction-resistance between the guide pin 7 and guide pin groove 4, as shown in a further embodiment of FIG. 7.

FIG. 7 illustrates an end view of a V-groove guide substrate in an optical connector according to another embodiment of the present invention. In the drawing, reference numeral 1 designates a V-groove guide substrate of silicon having optical fiber V-grooves 3 and guide pin V-grooves 4 formed in its upper surface. An oxide film 34 is formed on the surfaces of the optical fiber grooves 3 and the guide pin grooves 4.

The V-groove guide substrate 1 is made of silicon and the optical fiber grooves 3 and the guide pin grooves 4 are formed thereon, for example, by cutting or the like. Then, the silicon in the surface of the optical fiber grooves 3 and the guide pin grooves 4 is oxidized by a diffusion method to form the oxide film 34. Although the drawing shows a case where the oxide film 34 is formed over the whole surface of the V-groove guide substrate 1, the oxide film 34 is formed on the guide pin V-grooves 4 with a width of 100 $\mu$m at least in the vicinity of the contact point between each guide pin V-groove 4 and the guide pin. It is preferable to select the thickness of the oxide film 34 to be in a range of 0.01 to 2.0 $\mu$m because micro cracks can not be reduced if the film thickness is too thin, on the contrary, the strength is weakened if it is too thick. As the material for the guide pins, it is preferable to use zirconia in order to prevent abrasion.

As stated above, in the optical connector according to the present invention, an oxide film 34 is formed to cover at least the surface of the guide pin V-grooves 4 so that micro cracks in the surface are reduced and cracks due to abrasion by the guide pins are also reduced. Accordingly, the starting points of cracks are reduced to thereby improve the strength against cracks.

As was described above, it is preferable to select the thickness of the oxide film 34 to be in a range of 0.01 to 2.0 $\mu$m because micro cracks can not be reduced and no effect can be shown if the film thickness is too thin while stress acting on the boundary between the silicon material and the silicon oxide becomes so strong to break the silicon oxide if it is too thick on the contrary.

By using zirconia as a material for the guide pins 7, the abrasion of the guide pins 7 can be made to be almost zero because the hardness of zirconia is larger than stainless steel. Although there is cemented carbide as a material having a large hardness other than zirconia, abrasion caused when the guide pins are inserted/drawn out into/from the guide pin V-grooves 4 is smaller than the case using cemented carbide because the frictional coefficient with respect to silicon is smaller in the case using zirconia than the case using cemented carbide. It is estimated that a ceramic material having the same hardness and frictional coefficient as those of zirconia may be used for the guide pins 7.

The strength test of the optical connector thus organized which has been conducted by the inventors will be described.

A V-groove guide substrate 1 having optical fiber V-grooves 3 and guide pin V-grooves 4 formed in its upper surface was heated at 1050° C. for 2 to 3 hours in an atmosphere of oxygen and steam to thereby form an oxide film 34 having a film thickness of 0.2 to 0.3 $\mu$m. The thickness of the oxide film 34 can be controlled by changing the quantity of steam, the time, and the temperature. By using the V-groove guide substrate 1 subjected to oxidation treatment, an optical connector for collectively connecting SM fiber of 16 coated optical fibers was produced, and the strength and connection loss stability were estimated.

Figure 8:
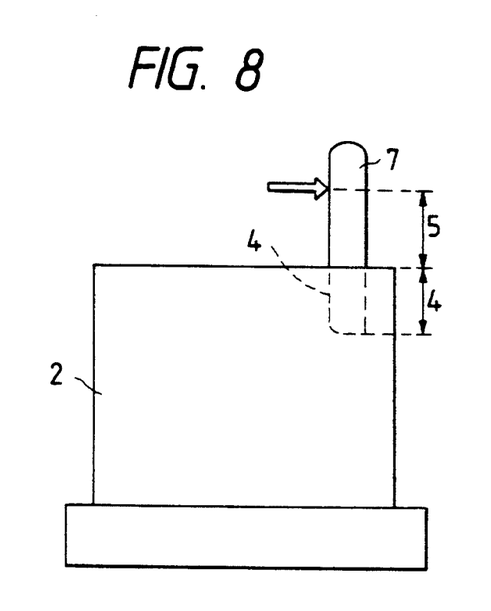
FIG. 8 is an explanatory top view of an example of test of the optical connector in the state where a guide pin is inserted according to the present invention.

FIG. 8 illustrates a top view of an optical connector in the state where a guide pin 7 has been inserted thereinto. As shown in FIG. 8, the guide pin 7 was inserted by 4 mm into a guide pin hole, and a force in the direction of arrow was exerted to the guide pin 9 at a position away by 5 mm from the end surface of an optical connector 50.

In the strength test, the test was conducted on 30 samples. As a result, it was confirmed that the average strength was 1.36 kg in the case of providing no oxide film 34, while the average strength was 1.79 kg in the case of providing an oxide film 34, so that the strength was improved by about 30%.

As a result of test on 30 samples with respect to the connection loss, it was confirmed that the change in contact loss due to connection/disconnection of the optical connector 300 times was 0.4 dB at maximum in the case of providing no oxide film 34 and using a stainless steel guide pin 7, while it was 0.2 dB at maximum in the case of providing an oxide film 34 and using a zirconia guide pin 7, so that the connection loss characteristic was improved.

Figure 9A:
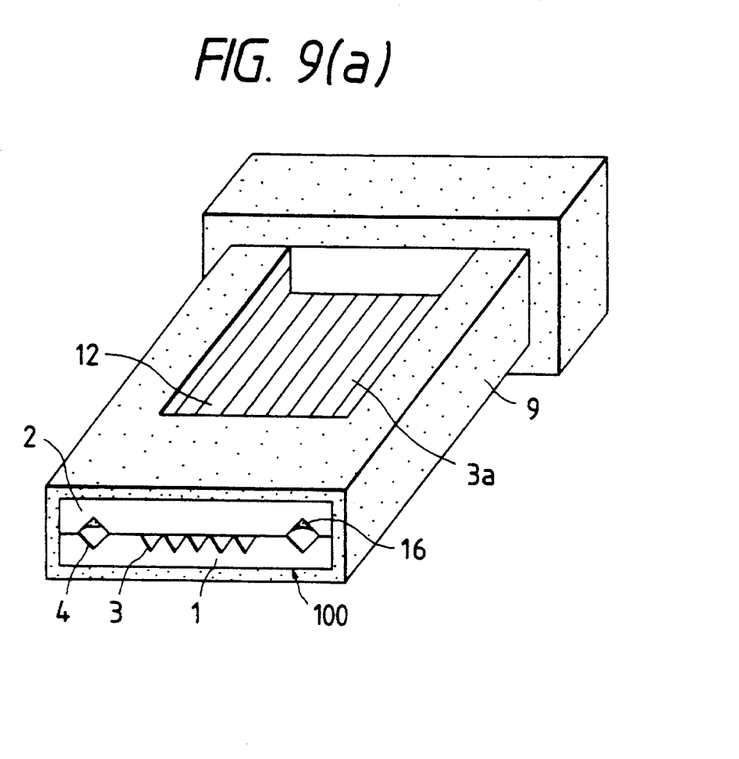
Figure 9B:
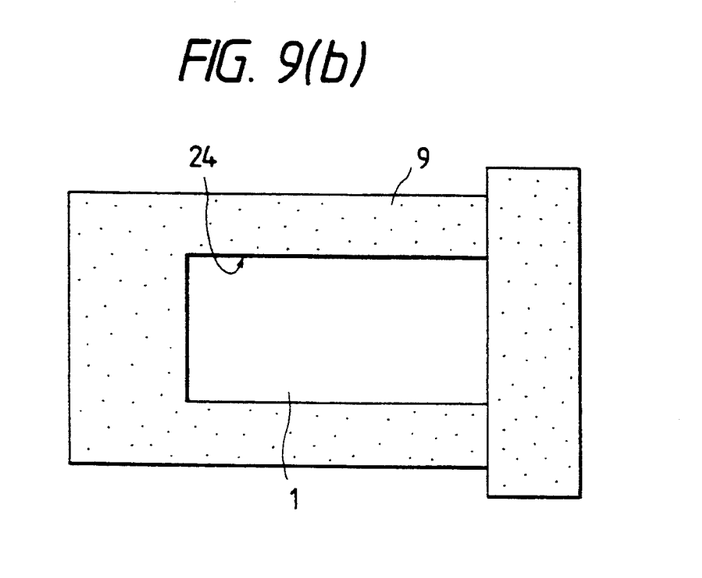
FIG. 9(b) is a back surface view of the FIG. 9(a)

FIGS. 9(a) and 9(b) are views for explaining an optical connector according to a still further embodiment of the present invention, in which FIG. 9(a) is a perspective view showing the whole of the optical connector, and FIG. 9(b) is a view showing the back surface of FIG. 9(a).

In the drawings, reference numeral 100 designates a V-shape guide member on which optical fiber guide grooves 3 and guide pin grooves are formed, and which provides an opening portion 12 at a portion of the upper surface. At the opening portion 12, the optical fiber guide grooves 3 are exposed partly at portions 3a of the optical fiber guide grooves 3. Reference numeral 9 designates a resin molding portion formed through resin-molding on the circumference of the V-groove guide member 100. The resin molding portion 9 provides opening portions 24 respectively in its front and back surface portions corresponding to the upper opening portion 12 so that a V-groove substrate 1 of the V-groove guide member 100 is partly exposed.

Figure 10A:
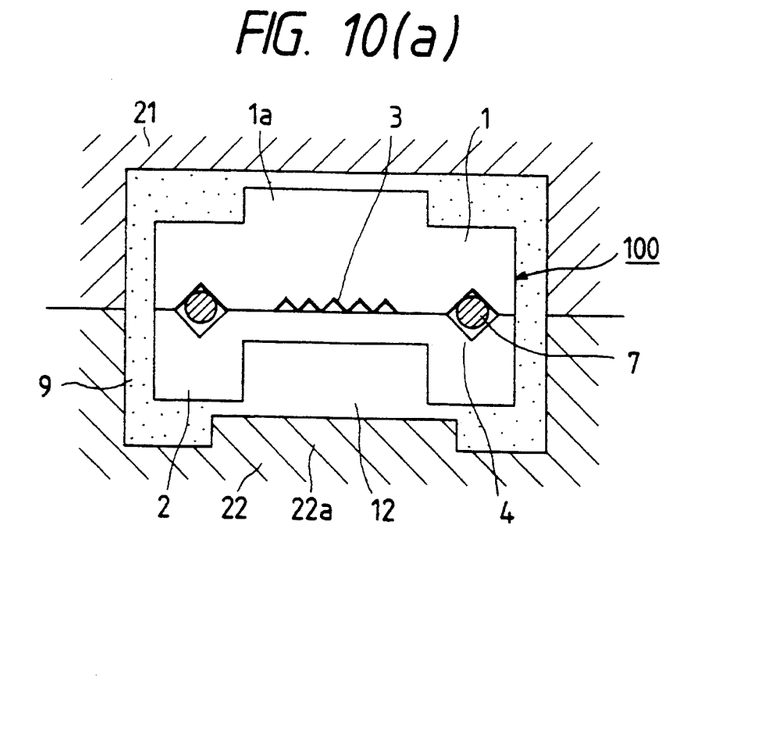
FIGS. 10(a) and 10(b) are cross sections of a metal mold at the time of resin-molding the optical connector of FIGS. 7(a) and 7(b).
Figure 10B:
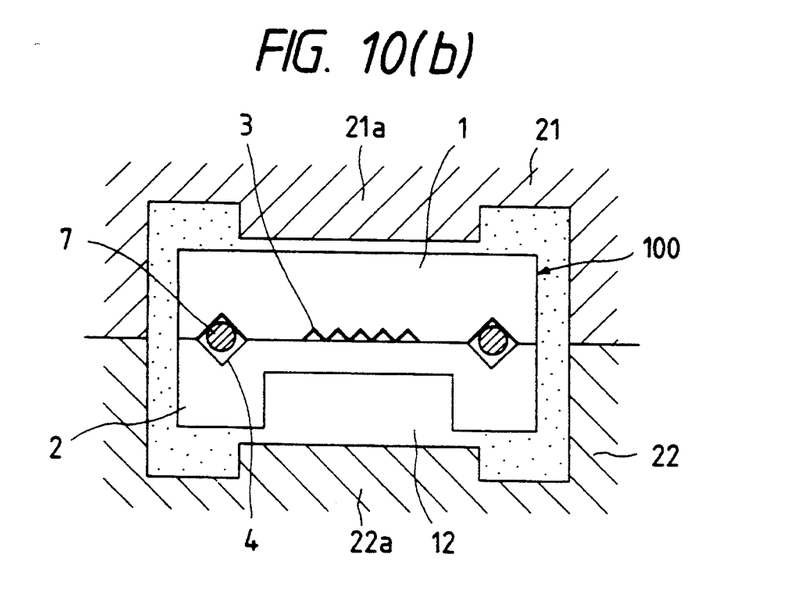

FIGS. 10(a) and 10(b) are cross sections illustrating manufacturing metal molds for obtaining the optical connector shown in FIGS. 9(a) and 9(b) according to the invention.

In FIG. 10(a), similarly to the conventional example, a projected portion 22a is provided on a lower metal mold 22 at a portion corresponding to the opening portion 12 of the V-groove guide member 100 to thereby form an opening-portion seal portion. Further, an upper metal mold 21 is also similar to that of the conventional example. However, a projected portion 21a is provided on the substrate 1 at a portion corresponding to the opening portion 12 of the V-groove guide member 100 to thereby form a seal portions and after molding no resin portion exists at this seal portion so as to form the opening portion 24 of the resin molding portion 9 at which the back surface of the substrate 1 is partly exposed.

Thus, the opening portion 24 in which no resin exists is formed also in the back surface of the V-groove substrate 1 corresponding to the opening portion 12 so that the molding pressures applied on the upper and lower surfaces of the V-groove guide member 100 are balanced with each other to make it possible to minimize the transformation of the V-groove guide member 100.

In FIG. 10(b), although the lower metal mold 22 is similar to that of the conventional example, a projected portion 21a is provided on the upper metal mold 21 at a position corresponding to the opening portion 12 of the V-groove guide member 100 similarly to the lower metal mold 22 to thereby form a seal portion. Accordingly, no molding resin exists at this seal portion so that the back surface of the substrate 1 is exposed partly at this portion.

In order to confirm the effects of the present invention, large-sized optical connectors each of which has a width of 24 mm and having 80 coated optical fibers were made of silicon chips and were estimated.

Each silicon chip was prepared so as to provide two guide pin grooves of 1.2 mm$\phi$, 80 optical-fiber guide grooves of 0.125 mm$\phi$, and an opening portion for inserting optical fibers. Thus, V-groove guide members 100 were formed respectively into such a molding pressure balance type guide member as shown in FIG. 10(a) and such a molding pressure unbalance type guide member providing no opening portion 24, and were subjected to molding with epoxy resin through transfer molding.

As a result, in the molding pressure balance type, no curve was generated in the V-groove guide member of the silicon chip and a multiple-coated-optical-fiber connector having an eccentricity of 0.5 $\mu$m could be formed. On the other hand, in the unbalance type, a curve was confirmed in the silicon chip and it was found that the silicon chip became most eccentric at its center so that it was bent by 2 $\mu$m at maximum in the up/down direction.

As was described above, according to the optical connector, the guide pins can be surely touched with the guide pin grooves by means of the elastic guide-pin pressing members, respectively, so that an optical connector having a low loss of not more than 0.1 dB can be realized in single-mode optical fibers. By provision of opening portions in the upper plate, molding resin can be poured through the opening portions so that the function of the elastic guide-pin pressing members can be formed, or the insert pressing members can be provided before resin molding. By making the dimension of $\Delta e$ be a parameter, the quantity of resin to be poured can be controlled and the upper position of each of the guide pins can be pressed.

Also, according to the optical connector of the present invention, by forming an oxide film over at least the surface of the guide pin V-grooves of the silicon V-groove guide substrate it is made possible to improve the friction-resistance of the optical connector, and by coupling such optical connectors by use of zirconia guide pins the abrasion of the guide pin V-grooves of the optical connectors can be reduced, and the connection loss is stabilized to thereby make it possible to realize an optical connector of low connection loss of about 0.1 dB in average.

Further, in the optical connector according to the present invention, an opening portion is provided in the resin molding portion on the back surface of the V-groove guide portion correspondingly to the opening portion in the upper surface thereof, so that the molding pressure can be balanced at the time of molding to thereby make it possible to obtain a highly-accurate optical connector in which the transformation of the V-groove guide member is minimized.

What is claimed is:

1. An optical connector for connecting optical fibers, comprising:
    a guide pin;
    a guide-groove substrate having guide grooves for positioning said optical fibers and said guide pin, said guide pin contacting a predetermined location on one of said guide grooves by which said guide pin is positioned;
    an upper plate having a groove portion for covering said guide pin positioned in said one of said guide grooves when said upper plate is coupled to said guide-groove substrate; and
    an elastic guide-pin pressing member provided in said groove portion at a position above said location where said one of said guide pin grooves contacts said guide pin.

2. An optical connector as claimed in claim 1, wherein said upper plate has an opening portion therein communicating with said groove portion.

3. An optical connector as claimed in claim 1, further comprising a resin molding portion, disposed about said guide-groove substrate and said upper plate, for covering said guide-groove substrate and said upper plate; and
    wherein said elastic guide-pin pressing member and said resin molding portion comprise the same resin material.

4. An optical connector as claimed in claim 1, wherein said elastic guide-pin pressing member is a resin insertion molded in said groove portion.

* * * * *